Patented June 17, 1941

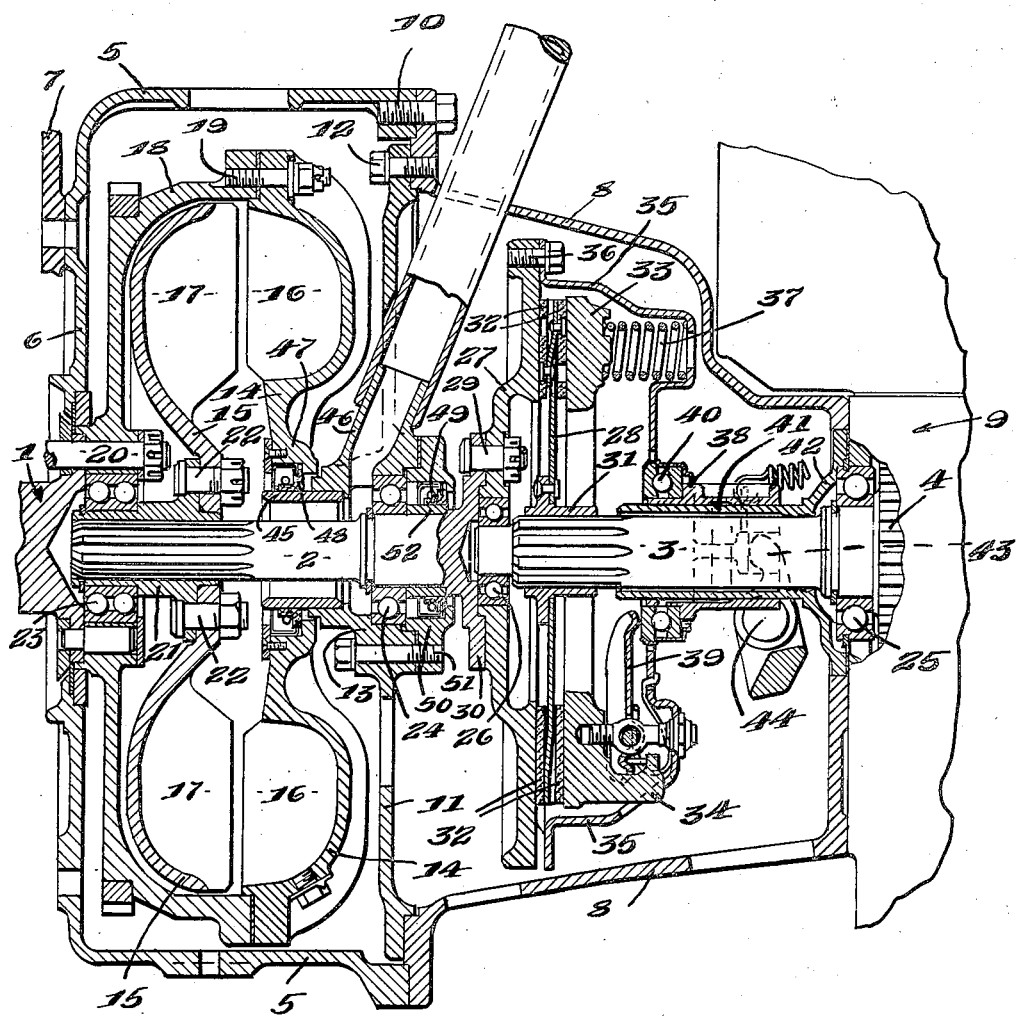

2,245,817

UNITED STATES PATENT OFFICE 2,245,817

TRANSMISSION MECHANISM

Carl D. Peterson and Albert H. Deimel, Toledo, Ohio

Application February 6, 1940, Serial No. 317,563

5 Claims. (Cl. 192—3.2)

This invention relates to power transmitting mechanisms including a hydraulic coupling unit or fluid flywheel and a releasable clutch unit through which the motion of the runner element of the coupling is transmitted to the input shaft of a gear set, and has for its object a particularly simple and economical arrangement and mounting for the coupling shaft and the clutch shaft or input shaft of the gearing, whereby the clutch unit on the input shaft can be readily assembled to the coupling unit.

It further has for its object an arrangement of the bearings for the coupling shaft and for the clutch or input shaft, whereby the clutch and coupling units can be readily assembled with ample bearings for the shafts and also an arrangement of the housings for the coupling unit and the clutch unit by which the couplings are readily and economically assembled and accessible.

The invention consists in the novel features and in the combinations and constructions hereinafter set forth and claimed.

In describing this invention, reference is had to the accompanying drawing which is a fragmentary, longitudinal, sectional view of a transmission mechanism involving a hydraulic coupling unit and housing, clutch unit and housing and change speed transmission gear box.

1 designates the drive shaft which may be the crank shaft of the internal combustion engine of the vehicle in which the transmission is installed; 2 the coupling shaft, and 3 the clutch shaft, which is the input shaft of a change speed gearing and usually the stem of the gear 4 of the transmission gearing.

5 designates the stationary housing for the hydraulic couping, this having a head wall 6 secured to the engine or the crank case 7 or any other convenient part thereof.

8 designates the clutch housing, this being usually the bell housing secured to or formed integral with the gear box 9 and being secured to the coupling housing 5 at its margins, as by screws 10. 11 designates an intermediate wall, partition or spider opposed to the head wall 6 and spaced from the wall 6 of the coupling housing 5. This may be secured to either the housing 5 or the clutch housing 8, it being here shown as secured to the clutch housing 8 within the housing 5, as by screws 12. This wall or partition 11 is provided with a central hub 13. The coupling shaft 2 and the clutch or input shaft 3 are mounted end to end in axial alinement with the drive shaft 1.

14 and 15 designate the impeller and runner elements of the hydraulic coupling or fluid flywheel, these being here shown as of the vane type and having substantially radial vanes 16, 17 on their opposing sides. The impeller 14 has a section or casing portion 18 secured thereto, as by screws 19, this casing portion being secured to an annular flange on the drive shaft 1, as by bolts 20. The runner element 15 is mounted in the casing 18 of the impeller, and has a hub 21 to which it is secured, as by bolts 22, the hub being splined on the shaft 2. A bearing 23 for the impeller concentric with the coupling shaft 2 is interposed between the hub and the wall of the central opening of the casing portion or section 18 of the impeller 14, so that the runner and the impeller can rotate relatively to each other. The coupling shaft 2 at its end remote from the drive shaft 1 is journalled in an intermediate bearing 24 carried by the hub 13 of the intermediate wall 11, the shaft projecting into the clutch housing 8.

The clutch shaft or the input shaft 3 of the gear set is journalled in a bearing 25 in the front wall of the gear box and in a bearing 26 at the rear end of the coupling shaft 2, this being virtually a pilot bearing in the rear end of the coupling shaft 2.

The clutch includes driving and driven members 27 and 28, the driving member being a disk secured, as by bolts 29, to an annular flange 30 on the rear end of the clutch shaft 2, the bearing 26 being located in the central opening of the disk 27. The driven member 28 is a disk having a hub 31 slidably splined on the shaft 3, the disk 28 having friction faces 32 on opposite sides of its margin coacting with the disk 27 and with a pressure ring 33 rotatable with the driving member 27, it being here shown as interlocked at 34 with the sheet metal back plate 35 of the clutch, which back plate structure is secured to the driving member 27, as by screws 36. Springs 37 thrust the pressure ring and the interposed or driven disk 28 toward the driving member 27. The clutch is operated by any suitable mechanism, as a throw-out sleeve 38 slidable lengthwise of the shaft 3, and motion transmitting members, as a series of levers, as the radial lever 39, between an antifriction bearing 40 on the sleeve 38 and the pressure ring. Any suitable throw-out or operating mechanism may be provided. The throw-out sleeve is here shown as slidable along a tubular guide 41 formed as a unit with the cap 42 for the bearing 25. The clutch operating mechanism further includes a yoke 43 mounted on the yoke shaft 44 mounted in the usual manner in the clutch or bell housing 8 and operated by the clutch pedal in the usual manner.

The intermediate hub 13 is provided with a tubular portion 45 spaced from the shaft 2 and forming an annular oil passage around the shaft 2 communicating with the interior of the coupling, that is, the space between the impeller 14 and the runner 15. This tubular portion 45 is here shown as a separate tube fitted into or secured to the hub 13 and the hub 13 is formed with a conduit coupling 46 extending radially from the upper side thereof for communicating with a source of hydraulic fluid or expansion tank, not shown. It may be used merely as a filler pipe. The impeller element 14 is provided with a hub 47 around the tubular portion 45 and a suitable oil tight bushing or seal 48 is interposed between the hub 47 and the periphery of the tubular portion 45. Also, an oil tight bushing or seal 49 is interposed between a cap 50 secured, as by screws 51, to the hub 13 and a bushing 52 on the shaft 2. The annular oil passage and the tubular portion 45 communicates with the chamber at the center of the coupling, this chamber being formed by terminating the vanes 16, 17 of the impeller and runner short of the axis of the coupling. Preferably the vanes 17 of the runner extend farther toward the center of the coupling than the vanes 16 of the impeller. However, these features of the impeller and runner constitute the subject matter of another application.

Owing to the arrangement of the coupling shaft 2, the input shaft 3 of the gear set and of the bearings therefor, and to the relative arrangement of the housings 6, 8 and the gear set, a conventional gear set having the conventional type of clutch mounted on the input shaft thereof may be readily and economically applied to the hydraulic coupling with the coupling shaft having ample bearings. After being installed, both the coupling and the clutch are readily get-at-able in contradistinction, to an assembly wherein the coupling shaft and the clutch shaft are practically one.

What we claim is:

1. The combination with a drive shaft, of a power transmission mechanism comprising a hydraulic coupling unit including an impeller rotatable with the drive shaft and a runner, a coupling shaft on which the runner is mounted, alined end to end with the drive shaft and having a journal bearing in the impeller, and a clutch unit including a clutch shaft alined end to end with the coupling shaft, and driving and driven members, the driving member being detachably coupled to the coupling shaft and the driven member being mounted on and rotatable with the clutch shaft, means operable to engage and disengage the driving and driven members, and housings for the units detachably coupled together, and one of said housings having a hub providing an intermediate bearing for the end of the coupling shaft remote from the drive shaft, the impeller having an oil sealed bearing on said hub.

2. The combination with a drive shaft, of a power transmission mechanism comprising a gear box, an input shaft journalled in the gear box and projecting through one end thereof and constituting a clutch shaft, a housing for an hydraulic coupling, a clutch housing between the gear box and the former housing, a coupling shaft mounted end to end with the drive and input shafts between the same, one of the housings being formed with an intermediate bearing in which the coupling shaft is mounted, the hydraulic coupling including an impeller and a runner having vanes opposed to each other, the impeller including a casing portion enclosing the runner and having a journal bearing concentric with the coupling shaft adjacent the drive shaft, the runner having a hub splined on the coupling shaft, the last-mentioned bearing being interposed between the hub and said casing portion of the impeller, the casing portion being secured to the drive shaft to rotate therewith, a friction clutch including driving and driven members rotatable respectively with the coupling shaft and the input shaft of the gearing, the driving clutch member being located adjacent the intermediate bearing, and operating means for the clutch.

3. The combination with a drive shaft, of a power transmission mechanism comprising a hydraulic coupling unit including an impeller rotatable with the drive shaft and a runner, a shaft on which the runner is mounted alined with the drive shaft and having a journal bearing in the impeller, and a clutch unit including a clutch shaft, and driving and driven members, the driving member being detachably coupled to the former shaft and the driven member being mounted on and rotatable with the clutch shaft, means operable to engage and disengage the driving and driven members, housings for the units detachably coupled together, and one of them having a hub providing an intermediate bearing for the end of the coupling shaft remote from the drive shaft, the impeller having an oil sealed bearing on said hub, the hub having a tubular portion spaced from the coupling shaft providing an annular passage communicating with the interior of the coupling at the central portion thereof, and a stationary conduit communicating with the annular chamber.

4. The combination with a drive shaft, of a power transmission mechanism comprising a hydraulic coupling unit including an impeller rotatable with the drive shaft and a runner, a shaft on which the runner is mounted alined with the drive shaft and having a journal bearing in the impeller, and a clutch unit including a clutch shaft, and driving and driven members, the driving member being detachably coupled to the former shaft and the driven member being mounted on and rotatable with the clutch shaft, means operable to engage and disengage the driving and driven members, housings for the units detachably coupled together, and one of them having a hub providing an intermediate bearing for the end of the coupling shaft remote from the drive shaft, the impeller having an oil sealed bearing on said hub, the hub having a tubular portion spaced from the coupling shaft providing an annular passage communicating with the interior of the coupling at the central portion thereof, the hub also having a radial conduit coupling communicating with said passage.

5. The combination with a drive shaft, of a power transmission mechanism comprising a gear box, an input shaft journalled in the gear box and projecting through one end thereof, a housing for a hydraulic coupling, a clutch housing between the gear box and the former housing, a coupling shaft mounted end to end with the drive and the input shafts between the same, one of the housings being formed with an intermediate bearing in which the coupling shaft is mounted, the hydraulic coupling including an impeller and a runner having vanes opposed to each other, the impeller including a casing portion enclosing the runner and having a journal bearing concentric with the coupling shaft adjacent the drive shaft, the runner having a hub splined on the coupling shaft, the casing portion being secured to the drive shaft to rotate therewith, a releasable friction clutch including driving and driven members rotatable respectively with the coupling shaft and the input shaft of the gearing, the driving member being located adjacent the intermediate bearing, operating means for the clutch, said intermediate bearing being formed with an annular portion spaced from the clutch shaft forming a passage communicating with the interior of the coupling, and the impeller having an oil tight seal on said tubular portion.

CARL D. PETERSON.
ALBERT H. DEIMEL.